United States Patent [19]

Sasaki et al.

[11] Patent Number: 4,867,001
[45] Date of Patent: Sep. 19, 1989

[54] OUTPUT SHAFT ASSEMBLY IN POWER TRANSFER DEVICE

[75] Inventors: Kan Sasaki, Nagoya; Keisuke Takimura; Nobuaki Katayama, both of Toyota, all of Japan

[73] Assignee: Toyota Jidosha Kabushiki Kaisha, Aichi, Japan

[21] Appl. No.: 166,457

[22] Filed: Mar. 10, 1988

[30] Foreign Application Priority Data

Mar. 12, 1987 [JP] Japan .................................. 62-36264
Dec. 11, 1987 [JP] Japan ................................. 62-189153

[51] Int. Cl.⁴ ........................... F16H 1/14; F16H 1/20
[52] U.S. Cl. ....................................... 74/424; 180/247
[58] Field of Search ................. 74/417, 424; 180/247, 180/248, 249, 250

[56] References Cited

U.S. PATENT DOCUMENTS

| | | | |
|---|---|---|---|
| 2,787,915 | 4/1957 | Molton | 74/424 |
| 3,030,825 | 4/1962 | Diederich et al. | 74/424 X |
| 4,476,953 | 10/1984 | Hiraiwa | 180/247 X |
| 4,541,503 | 9/1985 | Akutagawa et al. | 180/247 X |
| 4,643,045 | 2/1987 | Katayama | 74/695 |
| 4,697,470 | 10/1987 | Sasaki et al. | 74/701 |

FOREIGN PATENT DOCUMENTS 2613656 10/1977 Fed. Rep. of Germany.
0367063 3/1963 Switzerland.

*Primary Examiner*—Dirk Wright
*Attorney, Agent, or Firm*—Oliff & Berridge

[57] ABSTRACT

In combination with a power transmission for an automotive vehicle, a power transfer device includes a transfer casing secured at one side thereof to a casing of the power transmission, a ring gear rotatably mounted within the transfer casing to be applied with driving power from the power transmission through a center differential, and an output shaft assembly mounted within the transfer casing to transmit the driving power from the ring gear to a propeller shaft. The output shaft assembly includes a drive pinion integrally formed with an internally splined hollow shaft portion rotatably mounted within the transfer casing and being in mesh with the ring gear, and an externally splined slide shaft axially slidably coupled within the hollow shaft portion of the drive pinion for rotation therewith and having an output end portion for drive connection to the propeller shaft.

4 Claims, 3 Drawing Sheets

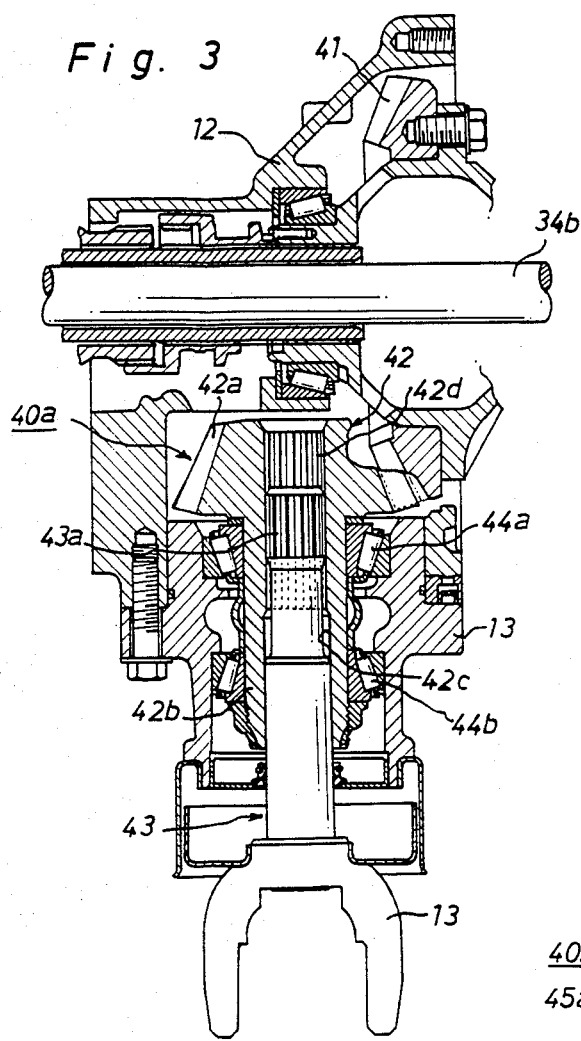
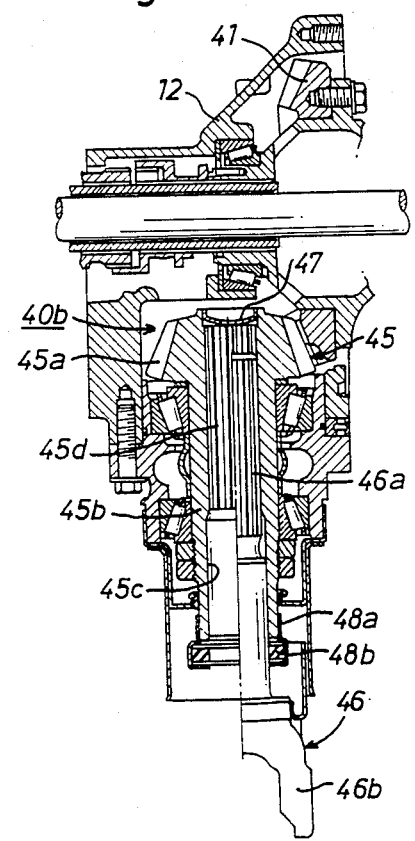

OUTPUT SHAFT ASSEMBLY IN POWER TRANSFER DEVICE

BACKGROUND OF THE INVENTION

1. Field of the Invention

The present invention relates to a power transfer device for four-wheel drive, and more particularly to an improvement of an output shaft assembly in the power transfer device.

2. Description of the Background

In U.S. Pat. No. 4,643,045 granted to Katayama on Feb. 17, 1987, there has been proposed a power transfer device for four-wheel drive in combination with a power transmission, wherein a ring gear is rotatably mounted on a lateral shaft in a casing of the transfer device to be applied with driving power from the power transmission through an intermediate or center differential gear unit, and wherein an output shaft is rotatably mounted within the casing and arranged in a fore-and-aft direction of the vehicle to transmit the driving power from the ring gear to a propeller shaft for rear-wheel drive. The output shaft is supported by a pair of axially spaced bearings carried on the casing and has an input end portion integral with a drive pinion meshed with the ring gear and an externally splined output end portion for drive connection to the propeller shaft. In such a structure as described above, the output shaft must be elongated for drive connection to the propeller shaft and enlarged in diameter to ensure sufficient rigidity of the externally splined output end portion, while the casing must be enlarged and thickened in its peripheral wall to support thereon the externally splined output end portion of the output shaft. For this reason, the power transfer device becomes heavy and large in size.

SUMMARY OF THE INVENTION

It is, therefore, a primary object of the present invention to provide an improved output shaft assembly capable of reducing the size of the transfer casing as small as possible.

According to the present invention, there is provided an output shaft assembly which comprises a drive pinion integrally formed with an internally splined hollow shaft portion rotatably mounted within the casing and being in mesh with the ring gear, and an externally splined slide shaft axially slidably coupled within the hollow shaft portion of the drive pinion for rotation therewith and having an output end portion for drive connection to the propeller shaft. In a preferred embodiment of the present invention, the slide shaft may be formed at its output end portion with an external spline on which a yoke member is mounted with a press fit for drive connection to the propeller shaft. Alternatively, the slide shaft may be integrally formed at its output end portion with a yoke member for drive connection to the propeller shaft.

With such an arrangement of the output shaft assembly as described above, only the hollow shaft portion of the drive pinion is carried on the casing to support the slide shaft thereon without providing any other support structure. This is useful to reduce the size of the casing so as to make the power transfer device as light as possible.

BRIEF DESCRIPTION OF THE DRAWINGS

Additional objects, features and advantages of the present invention will become readily apparent from the following detailed description of a preferred embodiment and certain modifications thereof when taken together with the accompanying drawings, in which:

FIG. 3 is an enlarged sectional view illustrating a modification of the output shaft assembly shown in FIG. 2; and FIG. 4 an enlarged sectional view illustrating another modification of the output shaft assembly shown in FIG. 2.

DESCRIPTION OF THE PREFERRED EMBODIMENTS

Figure 1:
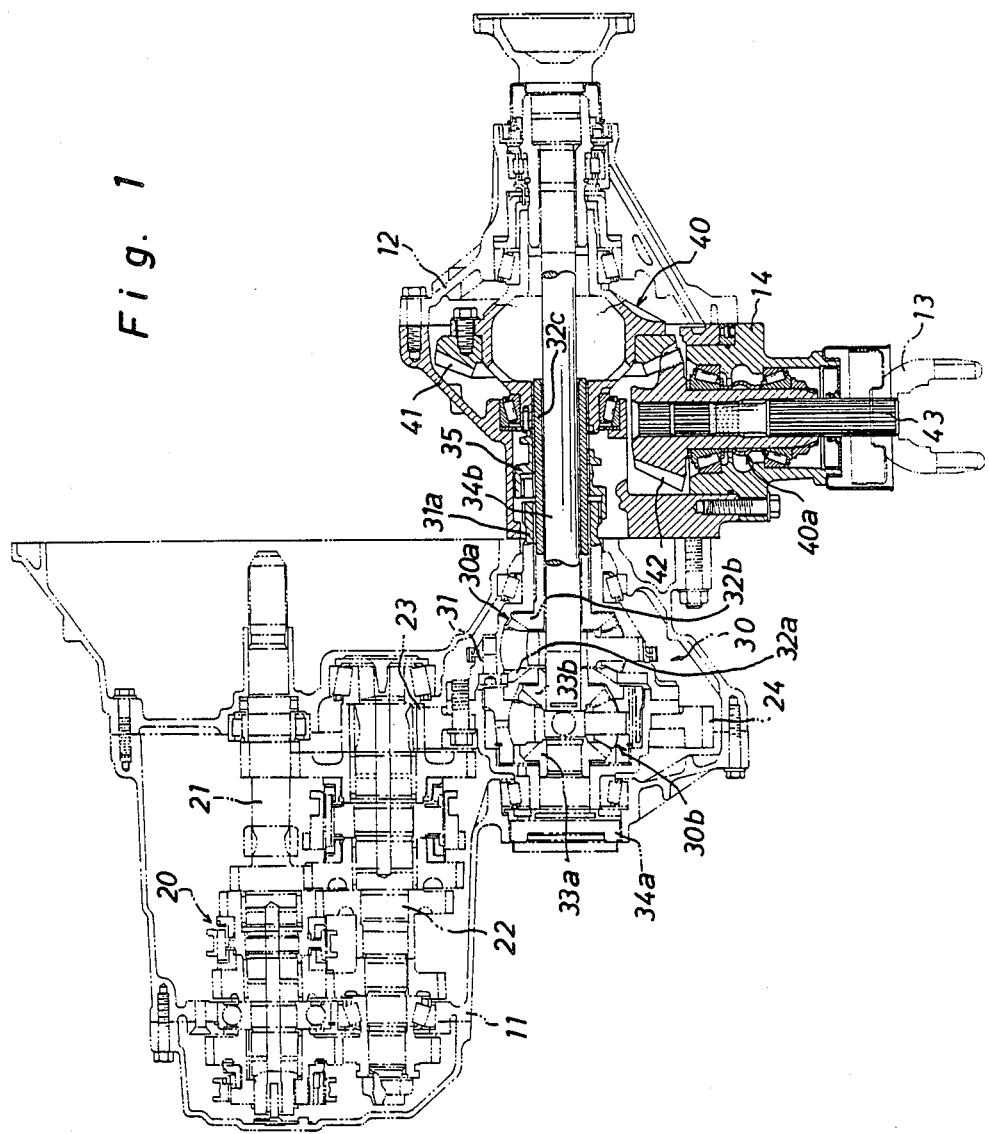
FIG. 1 is a sectional view of a power transfer device for four-wheel drive in combination with a power transmission.

Referring now to the drawings, FIG. 1 illustrates a power transfer device in combination with a power transmission 20 for an automotive vehicle of the front-engine front-wheel drive type. The power transmission 20 is contained within a transmission casing 11 secured at one side thereof to a cylinder block (not shown) of the vehicle engine. The power transmission 20 includes an input shaft 21 rotatably mounted within the transmission casing 11 and drivingly connected to the vehicle engine through a clutch mechanism (not shown), an output shaft 22 rotatably mounted within the casing 11 in parallel with the input shaft 21, a change-speed gearing mounted on the input and output shafts 21 and 22, and a final drive gearing including a ring gear 24 permanently in mesh with an output gear 23 mounted on the output shaft 22 for rotation therewith. In operation, the driving power of the engine is applied to the input shaft 21 through the associated clutch mechanism and transmitted at a selected gear ratio to the output shaft 22 by way of the change-speed gearing. Thus, the driving power from output shaft 22 is applied to the ring gear 24 through the output gear 23.

The power transfer device comprises a power split mechanism 30 which includes a center differential gear unit 30a and a front differential gear unit 30b. The center differential unit gear 30a is arranged to split the driving power from the power transmission 20 into two torque delivery paths for front-wheel drive and rear-wheel drive, and the front differential gear unit 30b is coaxially arranged with the center differential gear unit 30a to transmit the driving power from the center differential gear unit 30a to front road wheels. The center differential gear unit 30a includes an input member in the form of a gear casing 31 rotatably mounted within the transmission casing 11, a pair of side gears 32a and 32b rotatably mounted within the gear casing 31, and a pinion rotatably carried on the gear casing 31 and in mesh with the side gears 32a and 32b. The gear casing 31 carries thereon the ring gear 24 for rotation therewith and is integrally formed with a hollow shaft portion 31a which extends outwardly from the transmission casing 11. The side gear 32b is connected with a hollow shaft 32c which extends outwardly from the transmission casing 11 through the hollow shaft portion 31a of gear casing 31.

The front differential gear unit 30b is rotatably mounted within the gear casing 31 of center differential gear unit 30a. The differential gear unit 30b includes an inner gear casing integral with the side gear 32a of center differential gear unit 30a, a pair of side gears 33a and 33b rotatably mounted within the inner gear casing, and a pinion rotatably carried on the inner gear casing and in mesh with the side gears 33a and 33b. The side gear 33a is splined to the inner end of a left-hand side shaft 34a for drive connection to one of the front road wheels, while the side gear 33b is splined to the inner end of a right-hand side shaft 34b for drive connection to the other front road wheel.

The power transfer device further comprises a transfer casing 12 which is detachably secured in a liquid-tight manner at its left end seating face to the right end seating face of transmission casing 11 to contain therein the hollow shaft portion 31a of gear casing 31 and the hollow shaft 32c in drive connection with side gear 32b. Assembled within the transfer casing 12 is a carrier member 40 which is arranged coaxially with the differential gear units 30a and 30b and in surrounding relationship with the right-hand side shaft 34b. The carrier member 40 is rotatably supported by a pair of axially spaced bearings carried on the transfer casing 12 and is splined to the right end of hollow shaft 32c for rotation therewith. A second ring gear 41 is fixedly mounted on the carrier member 40 for rotation therewith and in mesh with a drive pinion 42 which is rotatably mounted within the transfer casing 12 in such a manner as described in detail later. Arranged between the center differential gear unit 30a and the carrier member 40 is a clutch sleeve 35 which is axially slidably mounted on the hollow shaft 32c by means of a spline connection. The clutch sleeve 35 is formed at its left end with an internally splined bore engageable with an external spline formed on the right end of hollow shaft portion 31a of gear casing 31.

Assuming that the clutch sleeve 35 is disengaged from the hollow shaft portion 31a of gear casing 31 as shown by an upper half in the figure, the center differential gear unit 30a operates to split the driving power into two torque delivery paths toward the side gears 32a and 32b. The driving power from side gear 32a is applied to the front differential gear unit 30b and transmitted to the left and right side shafts 34a and 34b through side gears 33a and 33b. On the other hand, the driving power from side gear 32b is applied to the carrier member 40 through the hollow shaft 32c and transmitted to the drive pinion 42 by way of the ring gear 41. When the clutch sleeve 35 is engaged with the hollow shaft portion 31a of gear casing 31 as shown by a lower half in the figure, the center differential gear unit 30a is locked to disable relative rotation of the side gears 32a and 32b.

Figure 2:
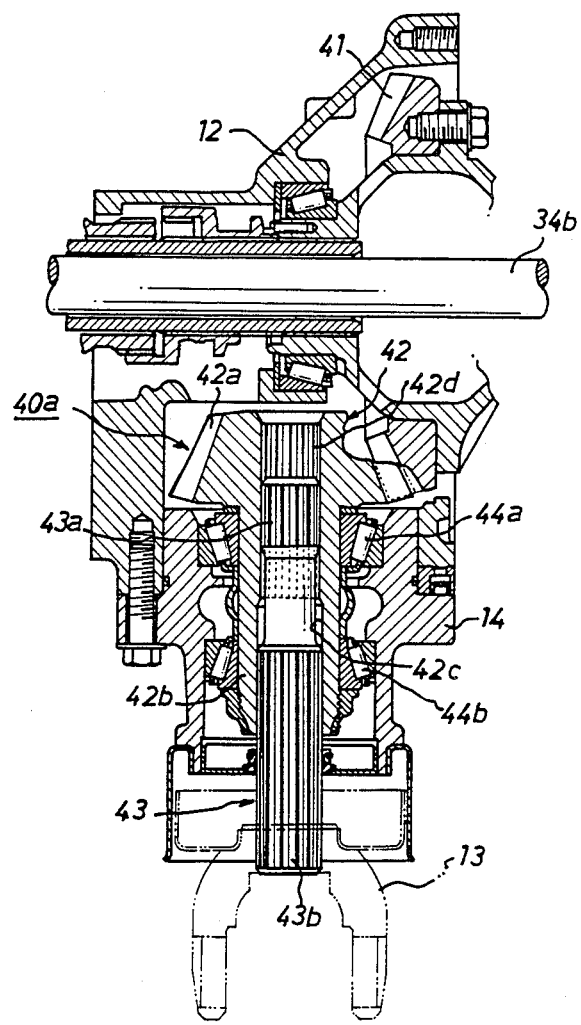
FIG. 2 is an enlarged sectional view of an output shaft assembly in the power transfer device shown in FIG. 1.

In this embodiment, as shown clearly in FIG. 2, the drive pinion 42 has a toothed portion 42a in mesh with the ring gear 41 and is integrally formed with an internally splined hollow shaft portion 42b which is rotatably mounted within the transfer casing 12. The hollow shaft portion 42b has a stepped axial bore 42c formed at its inner end portion with an internal spline 42d and is supported by a pair of axially spaced tapered roller bearings 44a and 44b carried on a support block 14 which is coupled within a rear end portion of transfer casing 12 in a liquid-tight manner and secured thereto by means of fastening bolts. An externally splined slide shaft 43 is axially slidably coupled within the stepped axial bore 42c of hollow shaft portion 42b for rotation therewith. The slide shaft 43 is in the form of a solid shaft formed at its inner end portion with an external spline 43a in engagement with the internal spline 42d of hollow shaft portion 42b and formed at its outer end portion with an external spline 43b on which a yoke member 13 is mounted with a press fit for drive connection to a propeller shaft (not shown) for rear-wheel drive. Thus, an output shaft assembly 40a for rear-wheel drive is composed of the internally splined hollow shaft portion 42b of drive pinion 42 and the externally splined slide shaft 43.

In such an arrangement of the output shaft assembly 40a as described above, only the hollow shaft portion 42b of drive pinion 42 is carried on the support block 14 to support the slide shaft 43 thereon without providing any other support structure. This is useful to reduce the axial length of support block 14 so as to make the size of the power transfer device as small as possible.

In FIG. 3 there is illustrated a modification of the output shaft assembly 40a wherein the slide shaft 43 is integrally formed at its outer end portion with the yoke member 13. In FIG. 4 there is illustrated another modification of the output shaft assembly 40a wherein a slide shaft 46 has an inner end portion formed with an external spline 46a and an outer end portion integrally formed with a yoke member 46b for drive connection to the propeller shaft, and wherein a drive pinion 45 has a toothed portion 45a in mesh with the ring gear 41 and is integrally formed with an internally splined hollow shaft portion 45b which is rotatably mounted transfer casing 12 substantially in the same manner as that in the embodiment shown in FIG. 2. In this modification, the hollow shaft portion 45b of drive pinion 45 has a stepped axial bore 45c formed at its inner end portion with an internal spline 45d in engagement with the external spline 46a of slide shaft 46. The hollow shaft portion 45c is closed in a liquid-tight manner at its innermost end by means of a seal cap 47 fixedly coupled with the inner end of drive pinion 45 and is provided at its outer end with an annular retainer 48a in which an annular seal member 48b is coupled to support the slide shaft 46 in a liquid-tight manner.

In the modification of FIG. 4, the seal cap 47 is useful to prevent leakage of the lubricating oil from the transfer casing 12 when the slide shaft 46 has been removed from the hollow shaft portion 45b of drive pinion 45 in a service factory. The annular seal member 48b is also useful to store an amount of grease for lubrication between the hollow shaft portion 45b of drive pinion 45 and the slide shaft 46.

Having now fully set forth the structure and operation of preferred embodiment and certain modifications of the concept underlying the present invention, various other embodiments as well as other modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power transfer device in combination with a power transmission for an automotive vehicle, comprising a transfer casing detachably secured at one side thereof to a casing of said power transmission, a ring gear rotatably mounted within said transfer casing to be applied with driving power from said power transmission, and an output shaft assembly mounted within said transfer casing to transmit the driving power from said ring gear to a propeller shaft, wherein said output shaft assembly comprises a drive pinion integrally formed with an internally splined hollow shaft portion rotatably mounted within said transfer casing and being in mesh with said ring gear, and an externally splined slide shaft axially slidably coupled within the hollow shaft portion of said drive pinion for rotation therewith and having an output end portion for drive connection to said propeller shaft, said slide shaft being positioned to be freely movable in an axial direction, and wherein the hollow shaft portion of said drive pinion is closed at its innermost end by means of a seal cap fixedly coupled with said drive pinion and is provided at its outer end with an annular retainer in which an annular seal member is coupled to support said slide shaft.

2. A power transfer device as claimed in claim 1, wherein said slide shaft is formed at its output end portion with an external spline on which is fixedly mounted a yoke member for drive connection to said propeller shaft.

3. A power transfer device as claimed in claim 1, wherein said slide shaft is integrally provided at its output end portion with a yoke member for drive connection to said propeller shaft.

4. A power transfer device as claimed in claim 1, wherein the hollow shaft portion of said drive pinion has a stepped axial bore formed at an inner end portion thereof with an internal spline, and said slide shaft is in the form of a solid shaft formed at an inner end portion thereof with an external spline in engagement with the internal spline of said hollow shaft portion.

* * * * *